(12) United States Patent
Yanagihara

(10) Patent No.: US 7,920,581 B2
(45) Date of Patent: Apr. 5, 2011

(54) TREE-TYPE BROADCAST SYSTEM, METHOD OF PARTICIPATING AND WITHDRAWING TREE-TYPE BROADCAST SYSTEM, NODE DEVICE, AND NODE PROCESS PROGRAM

(75) Inventor: Yasushi Yanagihara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 190 days.

(21) Appl. No.: 12/078,155

(22) Filed: Mar. 27, 2008

(65) Prior Publication Data
US 2008/0279206 A1 Nov. 13, 2008

(30) Foreign Application Priority Data
May 7, 2007 (JP) .................................. 2007-122407

(51) Int. Cl.
*H04L 12/28* (2006.01)
*H04L 12/56* (2006.01)
(52) U.S. Cl. ......... 370/408; 370/230; 370/255; 370/256
(58) Field of Classification Search .................. 370/230, 370/230.1, 236, 255, 256, 386, 408
See application file for complete search history.

(56) References Cited

U.S. PATENT DOCUMENTS

| | | | | |
|---|---|---|---|---|
| 5,029,014 A * | 7/1991 | Lindstrom | ..................... | 386/106 |
| 5,559,548 A * | 9/1996 | Davis et al. | ..................... | 725/40 |
| 5,600,366 A * | 2/1997 | Schulman | ..................... | 725/36 |
| 6,185,586 B1 * | 2/2001 | Judson | ..................... | 715/207 |
| 6,487,721 B1 * | 11/2002 | Safadi | ..................... | 725/36 |
| 6,502,242 B1 * | 12/2002 | Howe et al. | ..................... | 725/109 |
| 6,507,950 B1 * | 1/2003 | Tsukidate et al. | ..................... | 725/54 |
| 6,608,817 B1 * | 8/2003 | Ivory | ..................... | 370/250 |
| 6,611,860 B1 * | 8/2003 | Ying | ..................... | 709/208 |
| 7,463,890 B2 * | 12/2008 | Herz et al. | ..................... | 455/445 |
| 2003/0101253 A1 * | 5/2003 | Saito et al. | ..................... | 709/223 |
| 2004/0030741 A1 * | 2/2004 | Wolton et al. | ..................... | 709/202 |
| 2004/0158865 A1 * | 8/2004 | Kubler et al. | ..................... | 725/82 |
| 2007/0133587 A1 * | 6/2007 | Hibino et al. | ..................... | 370/428 |
| 2007/0299711 A1 * | 12/2007 | Lundberg | ..................... | 705/8 |
| 2008/0114859 A1 * | 5/2008 | Orzen | ..................... | 709/218 |
| 2008/0215595 A1 * | 9/2008 | Suda | ..................... | 707/10 |
| 2008/0279206 A1 * | 11/2008 | Yanagihara | ..................... | 370/408 |

FOREIGN PATENT DOCUMENTS
JP A 2006-033514 2/2006

* cited by examiner

*Primary Examiner* — Aung S Moe
*Assistant Examiner* — Benjamin Elliott
(74) *Attorney, Agent, or Firm* — Oliff & Berridge, PLC

(57) ABSTRACT

A node device having a plural hierarchy levels in a tree-like shape while placing a broadcast device at a top of the levels and connecting the node devices through a communication means, wherein content data is sequentially transferred from the node device at an upper hierarchy level to that at a lower hierarchy level, including:
 a control means for displaying a predetermined screen for a user; and
 a means for carrying out a process of participating in the system when a broadcast information screen related to broadcast of the content data is displayed and for carrying out a process of withdrawing from the system when display is finished,
wherein when transiting to display in another screen, the participation and withdrawal control means carries out the withdrawal process on a condition that the broadcast information screen is not displayed again within a waiting time previously set up.

11 Claims, 13 Drawing Sheets

FIG. 8

| CLASSIFICATION | SITE | URL | LIFE-OR-DEATH MONITOR TIME (s) |
|---|---|---|---|
| BROADCAST PAGE | SITE X | http://www.mysite.com/1.html | 60 (INITIAL VALUE) |
| SHOPPING PAGE | SITE X | http://www.mysite.com/2.html | 600 |
| MERCHANDISE INTRODUCTION PAGE | SITE X | http://www.mysite.com/3.html | 120 |
| NEWS PAGE | SITE X | http://www.mysite.com/4.html | 60 |
| ...... | SITE X | ...... | ...... |
| NEWS PAGE | SITE Y | http://www.othersite_b.com/1.html | 120 |
| ...... | SITE Y | ...... | ...... |
| NEWS PAGE | SITE Z | http://www.othersite_c.com/1.html | 50 |
| ...... | SITE Z | ...... | ...... |

TREE-TYPE BROADCAST SYSTEM, METHOD OF PARTICIPATING AND WITHDRAWING TREE-TYPE BROADCAST SYSTEM, NODE DEVICE, AND NODE PROCESS PROGRAM

The entire disclosures of Japanese Patent Application No. 2007-122407 filed on May 7, 2007 including the specification, claims, drawings and summary are incorporated herein by reference in its entirety.

BACKGROUND OF THE INVENTION

1. Field of the Invention

The present invention relates to a peer to peer (P2P) type communication system including a plurality of node devices mutually communicable through a network.

2. Discussion of the Related Art

In radio broadcast utilizing the internet, when broadcast pages acquired from websites related to radio broadcast via a browser in a personal computer (hereinafter referred to as "PC") are displayed, content data related to the radio broadcast are subjected to stream distribution to the PC.

On the other hand, a peer-to-peer type communication system has been recently featured as a new configuration instead of a server-client type which is the mainstream configuration in the current content distribution. A tree-type broadcast (distribution) system is for example in Japanese Unexamined Patent Publication No. 2006-33514. In this tree-type broadcast system, a plurality of node devices participating in the system form a plurality of hierarchy levels while placing a broadcast station (e.g. broadcast device) at a top of the hierarchy levels and connecting the hierarchy levels in a tree-like form via a communication means. Content data (e.g. image data and audio data) broadcasted (streamed) from the broadcast station are sequentially transferred (stream relay process) from node devices in higher hierarchy levels to node devices in lower hierarchy levels.

SUMMARY OF THE INVENTION

Such the tree-type broadcast system has a property that topology temporarily becomes unstable because a content broadcast path is temporarily disconnected in events of node withdrawal (release) upon user channel switching and power discontinuity.

Meanwhile, in a case where the above tree-type broadcast system is utilized from the web application, it is considered that the browser controls the node devices to make it possible to participate in the tree-type broadcast system when a browser in the node device displays broadcast page (web page) acquired from the website related to the content broadcast and controls the node devices to withdraw from the tree-type broadcast system when display of the broadcast page is finished.

However, in a case of such the control type, there is a problem that topology becomes unstable because display is frequently switched between the above broadcast page and the other web pages, frequently causing node withdrawal and re-participation.

On the other hand, it may be controlled to withdraw from the tree-type broadcast system when an operating system is finished in the node device. In such the case, there is a problem that bands are wastefully consumed in contradiction to user's intention wishing to avoid a stream relay process while the user does not browse broadcast pages.

The present invention is made in consideration of the above problems. A goal of the present invention is to provide a tree-type broadcast system, a method of participating in and withdrawing from a tree-type broadcast system, a node device, and a node process program enabling to stabilize topology even if displays of web pages are frequently switched over broadcast pages and enable to reduce wasteful consumption of a network resource in the user network environment.

According to a first aspect of the present invention, there is provided a node device in a tree-type broadcast system which is formed by participation of a plurality of node devices and has a plurality of hierarchy levels in a tree-like shape formed by the plurality of node devices while placing a broadcast device at a top of the hierarchy levels and connecting the plurality of node devices through a communication means, wherein content data broadcasted by the broadcast device being sequentially transferred from the node device at an upper hierarchy level to the node device at a lower hierarchy level, the node device including:

a display control means for displaying a predetermined screen in response to instruction from a user; and a participation and withdrawal control means for carrying out a participation process of participating in the tree-type broadcast system when a broadcast information screen related to broadcast of the content data is displayed and for carrying out a withdrawal process of withdrawing from the tree-type broadcast system when display of the broadcast information screen is finished, wherein in a case where it is finished to display in the broadcast information screen and transited to display in another screen with the display control means, the participation and withdrawal control means carries out the withdrawal process on a condition that the broadcast information screen is not displayed again within a waiting time previously set up.

According to this invention, in a case where display of screen transits from one to another after execution of a participation process of participating in the tree-type broadcast system caused by the display of the broadcast information screen and a lapse of displaying a broadcast information screen related to content data, the withdrawal process is carried out on a condition that the broadcast information screen is not displayed again within a predetermined waiting time previously set up. Therefore, if display of screens is frequently switched over, it is possible to stabilize topology even when display of other screens over the broadcast information screen is frequently switched over. Further, it is possible to suppress unnecessary consumption of network resource in a user's network environment.

According to the present invention, a participation process for participating in the tree-type broadcast system is carried out when a broadcast information screen related to a content data broadcast is displayed. In a case where display of the broadcast information screen is finished and transits to the other screen, the withdrawal process is executed on the condition that the broadcast information screen is not redisplayed within preset a waiting time. Therefore, it is possible to stabilize topology even if display of other screens is frequently switched over the broadcast information screen. Further, it is possible to reduce wasteful consumption of the network resource in the user network environment.

According to this invention, a node process program is embodied in a computer-readable medium and represents a sequence of instructions. When executed by a computer included in the node device, the instructions cause the computer to function as the display control means and the participation and withdrawal control means in the node device.

BRIEF DESCRIPTION OF THE DRAWINGS

FIG. 8 is a view showing an example of information registered on a life-or-death monitor time management table.

DETAILED DESCRIPTION OF THE PREFERRED EMBODIMENTS

Figure 1:
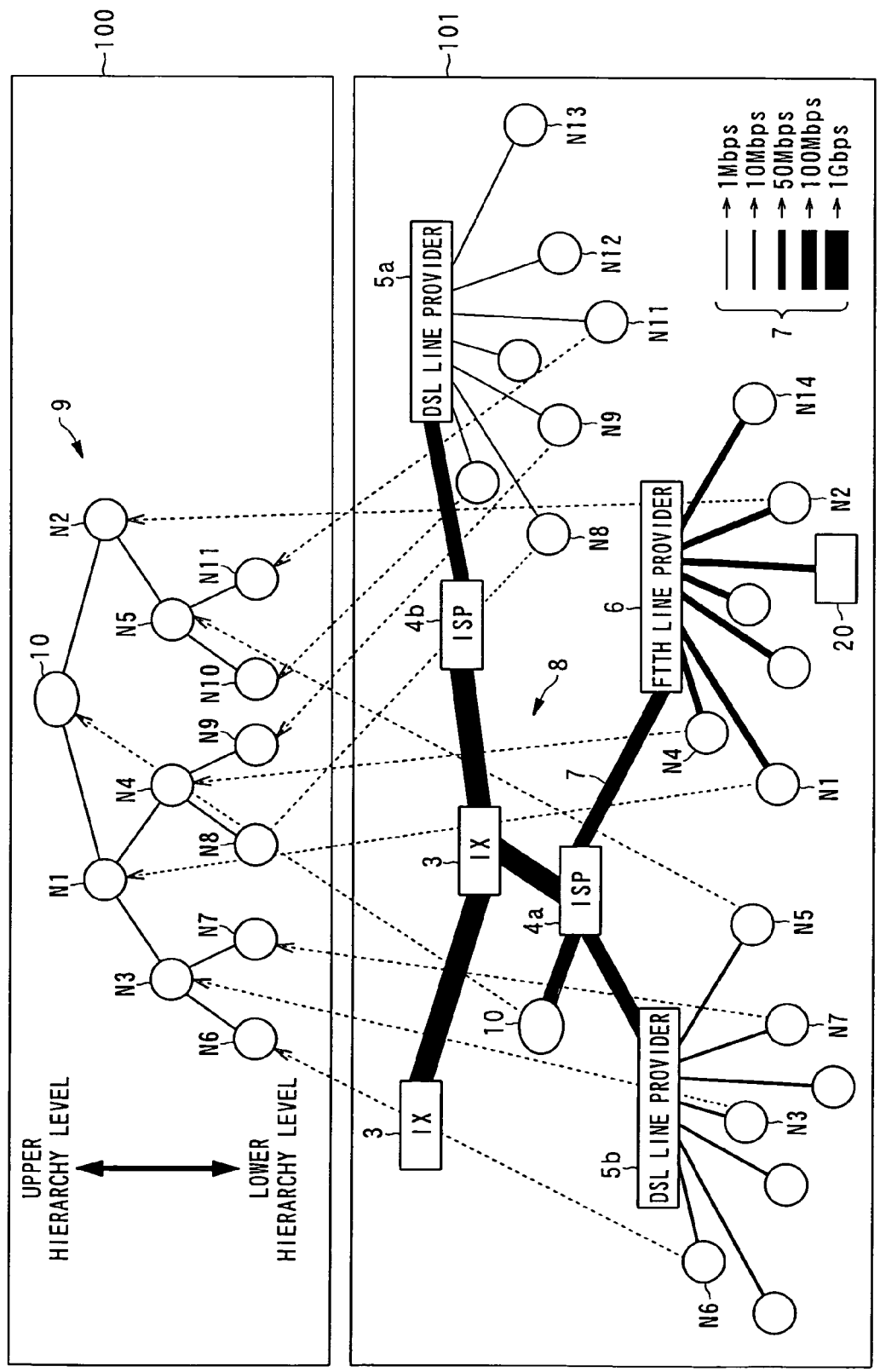
FIG. 1 is a view showing an example of connection status of respective node devices in a tree-type broadcast system according to the present embodiment.

Hereinafter, each designation of numerical reference in the drawings is typically as follows:
8: Network;
9: Overlay network;
10: Broadcast station;
20: Connection destination introduction server;
101, 201, 301: Main power;
102, 202, 302: Main memory unit;
103, 203, 303: Hard disk unit;
104, 204, 304: CPU;
105, 205, 305: Network interface;
106, 206, 306: Peripheral unit control chip;
107, 207, 307: Video chip;
108, 308: Audio source chip;
109, 208, 309: Keyboard;
110, 209, 310: Mouse;
111, 210, 311: Display;
112, 312: Built-in speaker;
113, 211, 313: System bus;
114, 212, 314: Router;
Nn: Node; and
S: Tree-type broadcast system Hereinafter, an embodiment of the present invention is explained based on figures.

[1. Configuration and the Like of Tree-Type Broadcast System]

First, with reference to FIG. 1 and the like, a schematic configuration and a function of a tree-type broadcast system according to an embodiment of the present invention will be described.

FIG. 1 is a view showing an example of connection status of respective node devices in a tree-type broadcast system according to the present embodiment.

As shown in lower frame 101 of FIG. 1, a network (communication network in real world) 8 of the Internet or the like is constructed by an internet exchange (IX) 3, internet service providers (ISP) 4a and 4b, digital subscriber line (DSL) providers (or device thereof) 5a and 5b, fiber to the home (FTTH) line providers (or device thereof) 6, and communication lines (e.g. a phone line or an optical cable) 7 and the like. Here, in the network (a communication network) 8 of the example in FIG. 1, a router for transferring data (packet) is appropriately inserted (not shown).

In such a network 8, a plurality of node devices (hereinafter referred to as "nodes") Nn (n=any one of 1, 2, 3 . . . ) are connected. And a unique manufacturing number and an IP (Internet Protocol) address are assigned to each of the nodes Nn. These manufacturing numbers and IP addresses do not overlap among a plurality of nodes.

Then, the tree-type broadcast system S according to the present embodiment is a peer to peer type network system formed (configured) by participation of any plural nodes Nn out of the nodes Nn, as shown in an upper frame 100 of FIG. 1. Here, a network 9 shown inside the upper frame 100 of FIG. 1 is an overlay network 9 (logical network) including a virtual link formed by use of the existing network 8.

In this tree-type broadcast system S, content data are distributed from a broadcast station (broadcast device) 10 by a streaming method, and the data are sequentially transferred from nodes Nn in the higher hierarchy level (hereinafter referred to as "upstream") to nodes Nn in the lower hierarchy level (hereinafter referred to as "downstream").

Further, such the topology is managed by a connection destination introduction server 20. And the connection destination introduction server 20 introduces an upstream node, which is a destination in the tree-type broadcast system S, to the node Nn in response to a connection destination introduction request from the node Nn.

Figure 2:
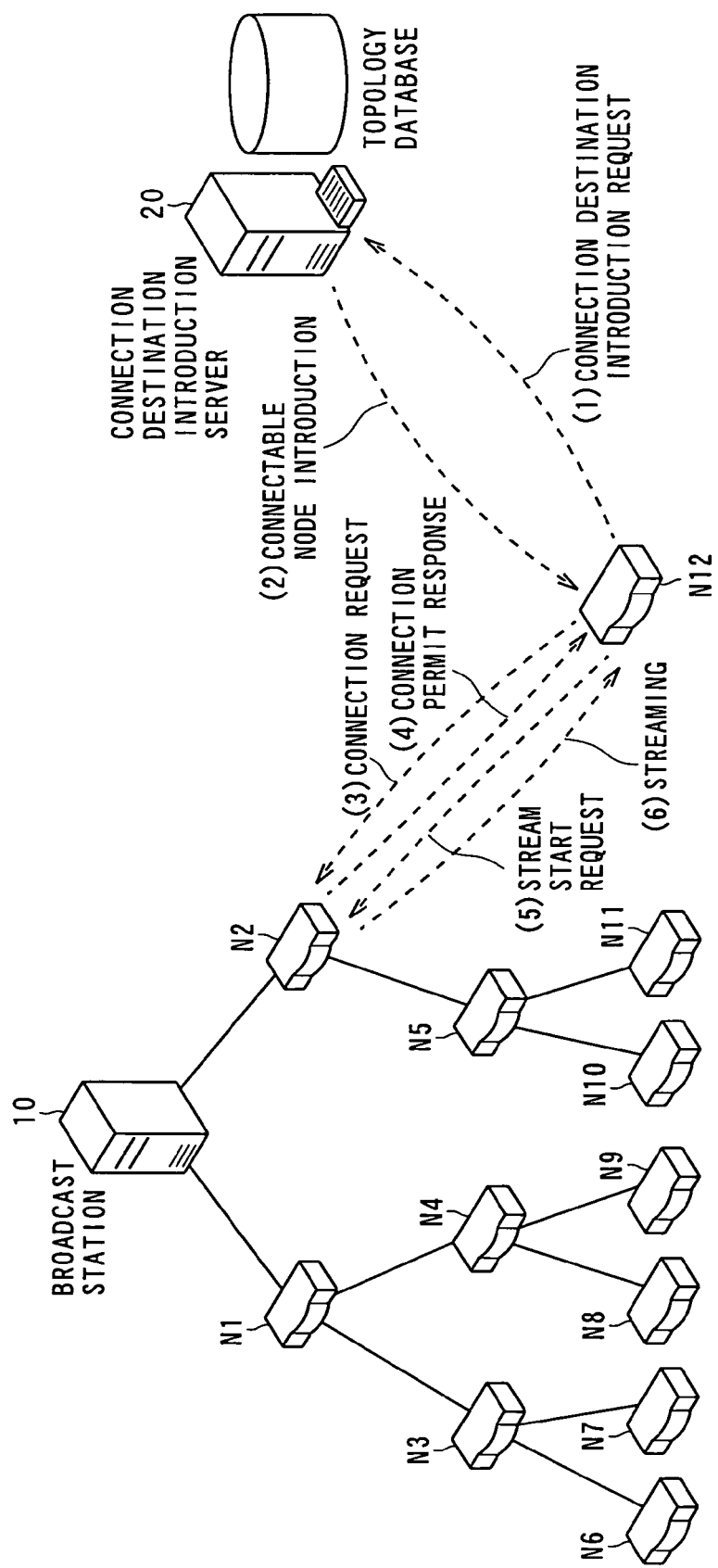
FIG. 2 is a schematic view showing a state where node N12 participates in a tree-type broadcast system S.

FIG. 2 is a schematic view showing a state where node N12 participates in a tree-type broadcast system S.

In FIG. 2, in a case where the node N12 participates in the tree-type broadcast system S (in other word, participates in topology), first the node N12 transmits connection destination introduction request information to the connection destination introduction server 20 (1). The connection destination introduction server 20 searches nodes Nn connectable to the downstream side from topology management information which is managed inside, returns (introduction of a connectable node) to the node N12 search result information including IP address, port number and the like of an upstream node candidate exceeding 1 (2). Next, the node N12 selects one, for example node N2, from upstream node candidates acquired from the connection destination introduction server 20, and transmits the connection request information to the node N2 (3). Next, the node N2 adds information of the node N12 to a node management table which is managed inside, and returns connection permit response information to the node N12 (4). Next, the node N12 transmits stream start request information to the node N2 (5). Finally, the node N2 prepares an object for stream relay inside the device and starts streaming to the node N12 (6). Thus, participation of the node N12 to the tree-type broadcast system S is completed.

On the other hand, in a case where the node N12 withdraws (separates) from the tree-type broadcast system S, the node N12 transmits a stream stop request and withdrawal request information to an upstream node N2, which is a stream supplier. In response to this, the node N2 discards a stream relay object to stop streaming to the node N12, and deletes information of the node N12 from a node management table at the same time to thereby terminate connection with the node N2.

In a case where a node Nn exists in a downstream side of the withdrawing node Nn, broadcast paths of these downstream nodes are restored by either of methods a) and b) to be described below.

a) Restoration by Timeout Method

The state of streaming from the upstream node is constantly monitored, and when stream supply is suspended for a predetermined time, the state of connection with the upstream node is discarded, and a new upstream node is connected by the above-mentioned procedures (1) to (6).

b) Restoration by Event Notification Method

When the upstream node withdraws from the tree-type broadcast system S, withdrawal event is notified to a downstream node immediately below. When the downstream node receives the withdrawal event from the upstream node, the state of connection with the upstream node is discarded, and a new upstream node is connected in accordance with the above-mentioned procedures (1) to (6).

Further, respective nodes Nn participating in the tree-type broadcast system S monitor the state of receiving stream from upstream nodes, and the state becomes lower than a predetermined receipt quality, upstream nodes are switched by the above-mentioned procedures (1) to (6). For example, node N5 can switch the upstream node (stream supplier) to node N6 from node N2. As evaluation criteria of receipt quality, an average packet rate and a packet lost rate for a past predetermined period can be used.

[1-2. Configuration and the Like of Broadcast Station 10]

Next, with reference to FIG. 3, a configuration and a function of a broadcast station 10 will be explained.

Figure 3:
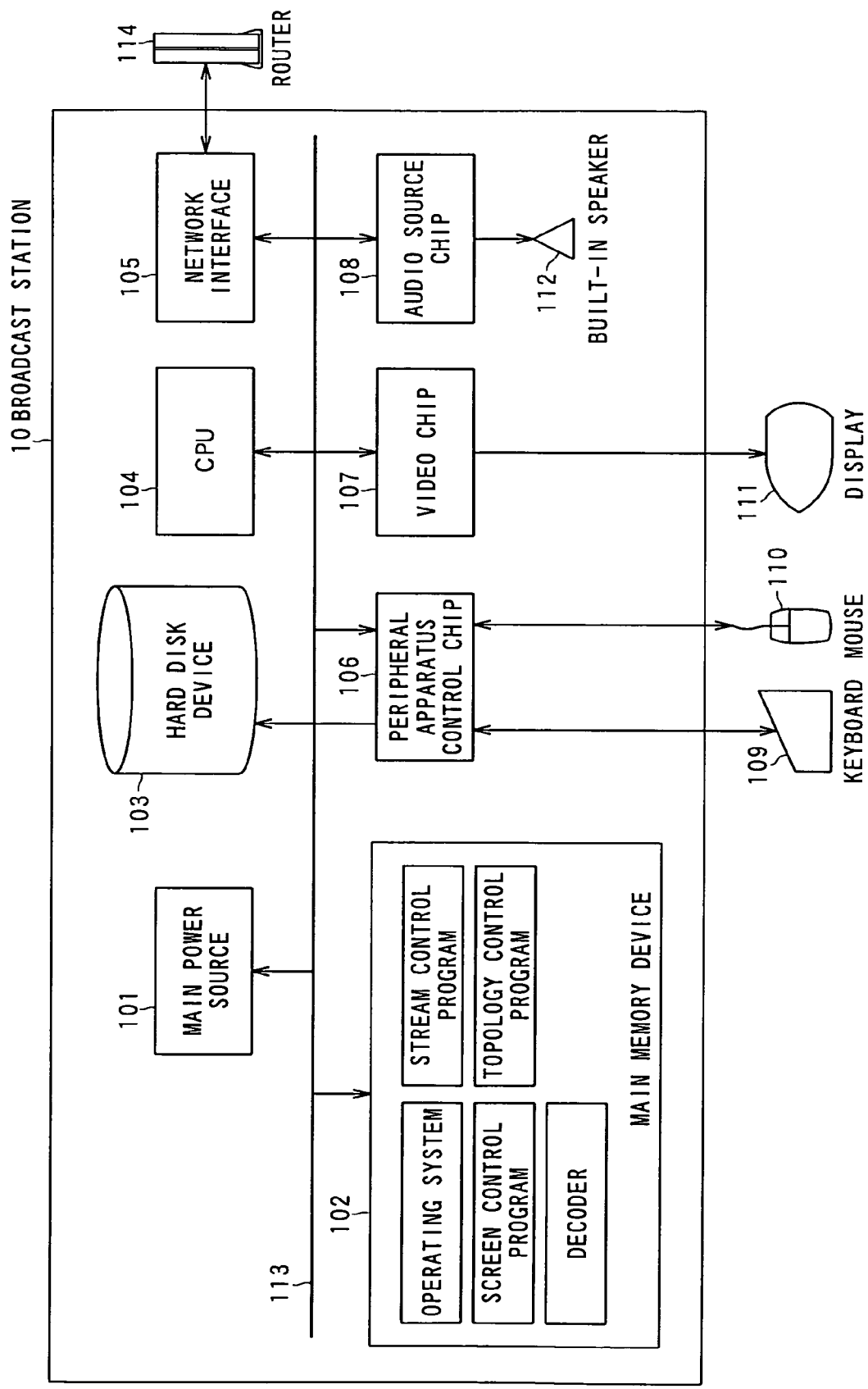
FIG. 3 is a view showing an example of a schematic configuration of a broadcast station 10.

FIG. 3 is a view showing an example of a schematic configuration of the broadcast station 10.

As shown in FIG. 3, the broadcast station 10 includes a main power 101, a main memory unit 102, a hard disk unit 103, CPU 104, a network interface 105, a peripheral unit control chip 106, a video chip 107, an audio source chip 108, a keyboard 109, a mouse 110, a display 111, a built-in speaker 112, and the like. The main power 101, the main memory unit 102, the hard disk unit 103, the CPU 104, the network interface 105, the peripheral unit control chip 106, the video chip 107, and the audio source chip 108 are mutually connected via a system bus 113. Further, a broadcast station 10 is connected to a network 8 via a router 114.

The main memory unit 102 includes RAM, ROM and the like, and stores an operating system, a stream control program, a screen control program, a topology control program, and a decoder (program) and the like. The main memory unit 102 stores a node management table, and the node management table registers information (IP address, port number and the like) of downstream nodes, which are connected with the broadcast station 10. The main memory unit 102 has a buffer memory (e.g. ring buffer).

The hard disk unit 103 records broadcast content data.

The CPU 104 carries out a broadcast process by a variety of programs stored in the main memory unit 102 (that is, by executing programs). For example, a broadcast process is carried on by packetizing content data recorded in the hard disk unit 103 and broadcasting (streaming) them to downstream nodes registered on the node management table.

As such a broadcast station 10, any node Nn may be applicable besides exclusive broadcast servers.

[1-3. Configuration and the Like of Connection Destination Introduction Server 20]

Figure 4:
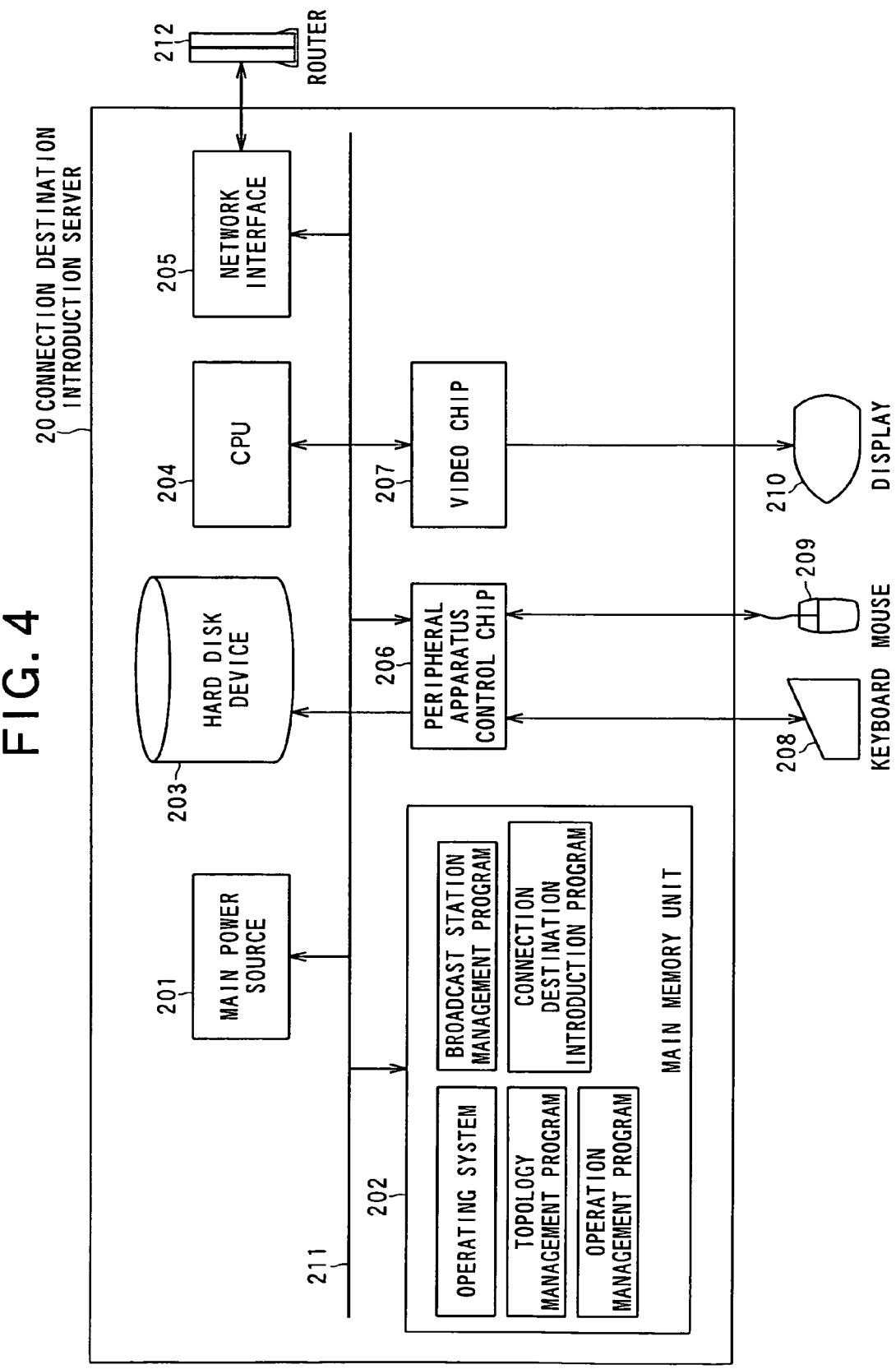
FIG. 4 is a view showing an example of a schematic configuration of a connection destination introduction server 20.

Next, with reference to FIG. 4, a configuration and a function of a connection destination introduction server 20 are explained.

FIG. 4 is a view showing an example of a schematic configuration of the connection destination introduction server 20.

As shown in FIG. 4, the connection destination introduction server 20 includes a main power 201, a main memory unit 202, a hard disk unit 203, CPU 204, a network interface 205, a peripheral unit control chip 206, a video chip 207, a keyboard 208, a mouse 209, a display 210, and the like. The main power 201, the main memory unit 202, the hard disk unit 203, the CPU 204, the network interface 205, the peripheral unit control chip 206, and the video chip 207 are mutually connected via a system bus 211. Further, the connection destination introduction server 20 is connected to a network 8 via a router 212.

The main memory unit 202 includes RAM, ROM and the like, and stores an operating system, a broadcast station management program, a topology control program, a connection destination introduction program, an operation management program, and the like.

Further, the hard disk unit 203 is provided with a broadcast station management database and a topology database. The broadcast station management database is registered with location information of respective broadcast stations 10 (e.g. IP address and port number) corresponding to broadcast channel information (e.g. channel number). The topology database is registered with topology management information. The topology management information exists in respective broadcast channels and is corresponding to broadcast channel information. The topology management information includes node information (e.g. IP address and port number) of respective nodes Nn participating in topology, hierarchy levels where respective nodes Nn locate in the topology, downstream node information indicating respective downstream nodes of respective nodes Nn, the connection allowable number of downstream nodes which are connectable to respective nodes Nn, and transfer capacity of respective nodes Nn for transferring content data to the other nodes Nn. Here, the transfer capacity is, for example, processing speed (GHz) of CPU of node Nn and effective bandwidth (e.g. data transfer speed (bps)) in the network 8.

According to various programs stored in the main memory unit 202, the CPU 204 searches an upstream node (node Nn connectable to downstream side) where the number of downstream nodes thus connected does not meet the connection allowable number, for example, from the above topology management information according to the connection destination introduction request from nodes Nn, and carries out introduction process to introduce thus searched upstream node candidates exceeding one as a connection destination.

[1-4. Configuration and the Like of Node Nn]

Figure 5:
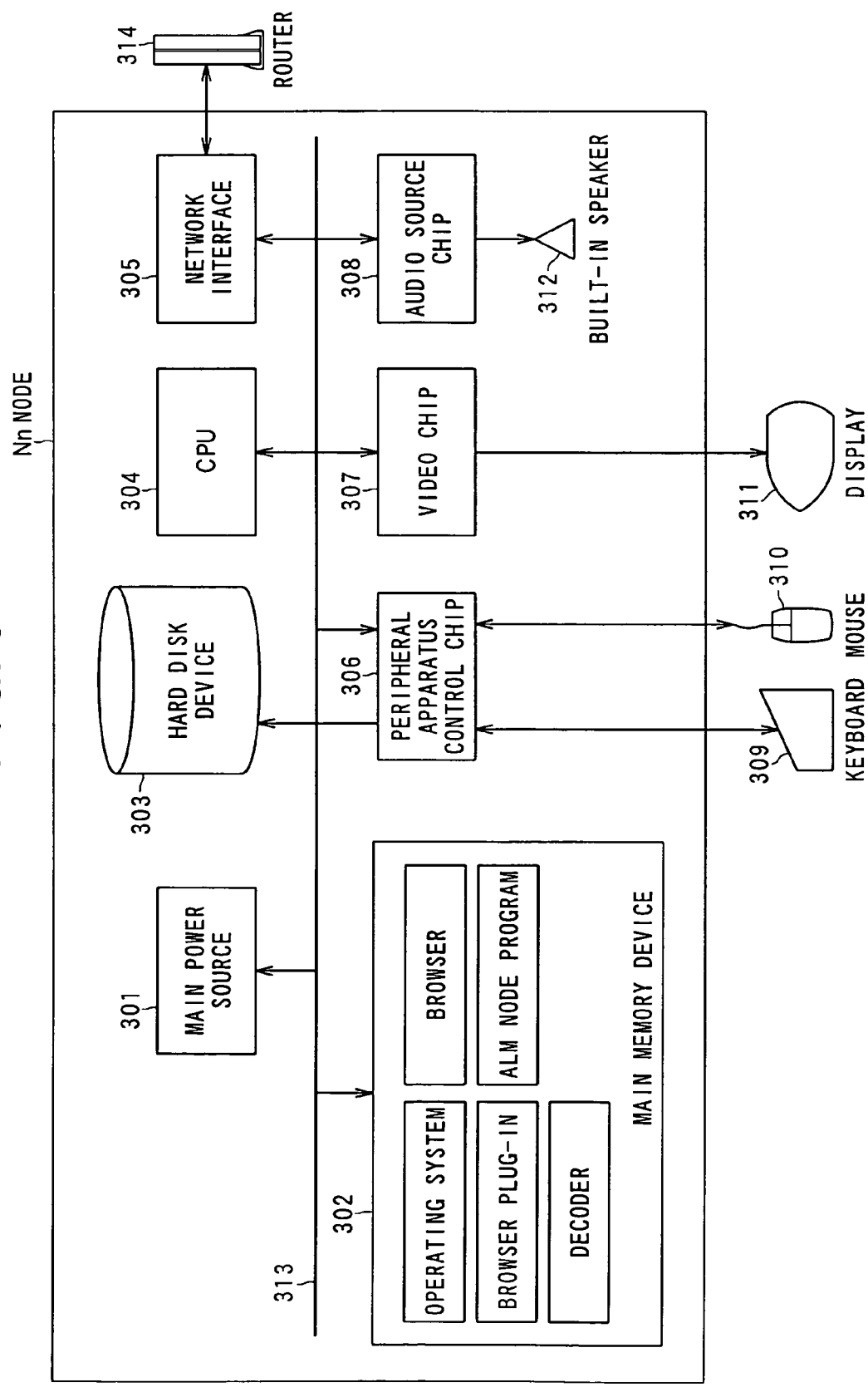
FIG. 5 is a view showing an example of schematic configuration of node Nn.

Next, with reference to FIG. 5, a configuration and a function of node Nn are explained.

FIG. 5 is a view showing an example of schematic configuration of node Nn.

As shown in FIG. 5, a node Nn includes a main power 301, a main memory unit 302, a hard disk unit 303, CPU 304, a network interface 305, a peripheral unit control chip 306, a video chip 307, an audio source chip 308, a keyboard 309, a mouse 310, a display 311, a built-in speaker 312, and the like. The main power 301, the main memory unit 302, the hard disk unit 303, the CPU 304, the network interface 305, the peripheral unit control chip 306, the video chip 307, and audio source chip 308 are mutually connected via a system bus 313. Further, the node Nn is connected to a network 8 via a router 314.

Meanwhile, PC, STB (Set Top Box), a TV receiver or the like is applicable as a node Nn.

The main memory unit 302 includes RAM, ROM, and the like and stores an operating system, a browser (browser program: an example of display control means), a browser plug-in, Application Layer Multicast (ALM) node program (an example of participation and withdrawal control means), and node processing programs such as decoder. Further, the main memory unit 302 stores a node management table and the node management table registers information (IP address, port number, and the like) of downstream node connected to an own node. Further, the main memory unit 302 has a buffer memory (e.g. ring buffer).

The CPU 304 accesses a site (designated by URL (Uniform Resource Locator)) in the predetermined server connected to a network 8 via the network interface 305 according to the browser, acquires from the site a web page configuring screen pages, and carries out a display process to thereby display the web page on the display 311 via the video chip 307. Meanwhile, the web page is configured by HTML (Hyper Text Markup Language) data and the like.

Further, according to ALM node program, the CPU 304 executes participation processing to participate in a tree-type broadcast system S (topology related to a certain broadcast channel) and, after the participation, the CPU 304 buffers a packet of content data (content stream) which are broadcasted from a broadcast station 10 or upstream nodes and received via the network interface 305 to thereby carries out reproduction process.

Here, in the above participation process, a connection destination introduction request is made to a connection destination introduction server 20, and stream start request is made by connecting (session-establishing) to the upstream node thus introduced from the connection destination introduction server 20.

Further, in the above reproduction process, content data (e.g. video data and audio data) accumulated in the received buffer memory are read and decoded by the decoder. And thus decoded video data (image information) are outputted to display on the display 311 via the video chip 307, and thus decoded audio data (sound information) are outputted from the built-in speaker 312 (or exterior speaker (not shown)) via the audio source chip 308.

In a case where the downstream node is connected to the own node, the CPU 304 carries out a transfer process to transfer (relay contents stream) respective packets of content data accumulated in the buffer memory to the downstream nodes according to ALM node program.

Further, the CPU 304 executes a withdrawal process to separate from the tree-type broadcast system S according to ALM node program.

Here, in the withdrawal process, stream stop is requested to an upstream node to thereby terminate connection with the upstream node, and topology withdrawal is notified to the connection destination introduction server 20.

Meanwhile, the browser and the ALM node program simultaneously are carried out as multitask (alternate process at extremely short intervals).

The CPU 304 executes participation processing to participate in the tree-type broadcast system S according to the ALM node program when a broadcast page related to the content data broadcast by the browser (an example of broadcast information screen) is displayed. The CPU 304 executes withdrawal process to separate from the tree-type broadcast system S according to the ALM node program when closing of the broadcast page by the browser is completed.

However, in the present embodiment, considering a case where display transits from a broadcast page to the other web page and subsequently the broadcast page is redisplayed (returned to the broadcast page), the CPU 304 does not immediately execute withdrawal process even if display of the broadcast page ends and executes the above withdrawal process on a condition that the broadcast page is not redisplayed within a preset waiting time. That is, the node is caused to participate in the tree-type broadcast system S only for a possible period of returning to the broadcast page even if display transits from the broadcast page to the other web page. The node is cased to separate from the tree-type broadcast system S when the above condition is satisfied. In other words, the CPU 304 controls to permanently maintain a state of content stream relay while the broadcast page is displayed and, on the other hand, only to relay content stream for a predetermined period according to a presumable stay period (i.e. period for user browsing the page) while non-broadcast page is displayed.

Hereinafter, a method of realizing this is explained.

For example, when a broadcast page is acquired from a site via a browser, a broadcast web application (e.g. configured by Java (trademark) script and Active X (trademark) script) is loaded and executed on the browser. When display of the broadcast page is finished, the broadcast web application is unloaded. And ALM node program queries about life-or-death of the broadcast web application at periodical (short) intervals to the broadcast web application. According to this, the broadcast web application provides the ALM node program with affirmative response. This affirmative response is monitored by a monitor timer.

If display transits from the broadcast page to the other web page and the broadcast page is not redisplayed (does not return) within the above-mentioned waiting time, the ALM node program can not obtain affirmative response from the broadcast web application. Therefore, the above monitor timer is timed out and the above withdrawal process is executed upon this timeout. In such a case, the above participation processing is newly executed because the own node is already withdrawn from the tree-type broadcast system S when the broadcast page is re-displayed.

On the other hand, if the broadcast page is redisplayed within a waiting time after the other web page is displayed instead of the broadcast page by transition or before the monitor timer is timed out, the above withdrawal process is not carried out, and participation continues because the broadcast web application is again loaded and affirmative response is obtained.

Figure 6:
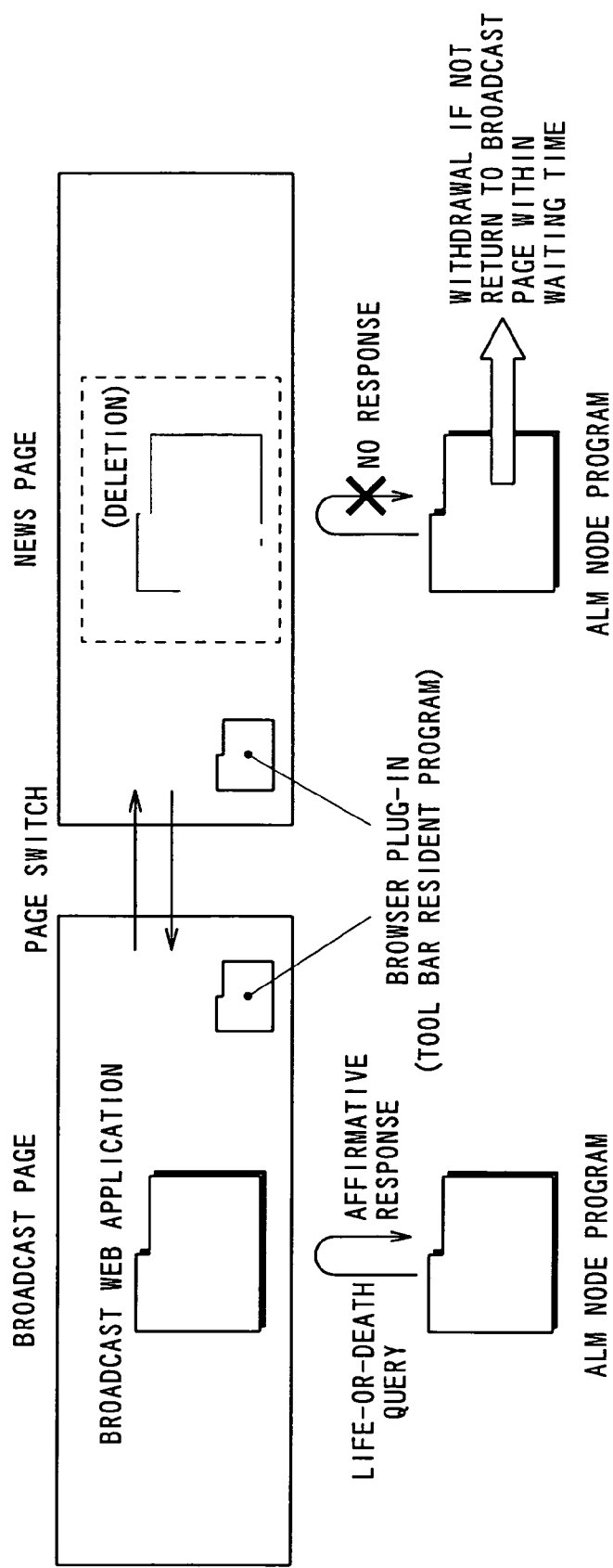
FIG. 6(A) is a conceptual diagram showing a case of receiving affirmative response to life-or-death query
FIG. 6(B) is a conceptual diagram showing a case of receiving no affirmative response to life-or-death query.

FIG. 6(A) is a conceptual diagram showing a case of receiving affirmative response with respect to life-or-death query, and FIG. 6(B) is a conceptual diagram showing a case of receiving no affirmative response with respect to life-or-death query.

Meanwhile, as a web page display-transited from the broadcast page, a web page linked (hyperlinked) to the broadcast page can be exemplified.

Figure 7:
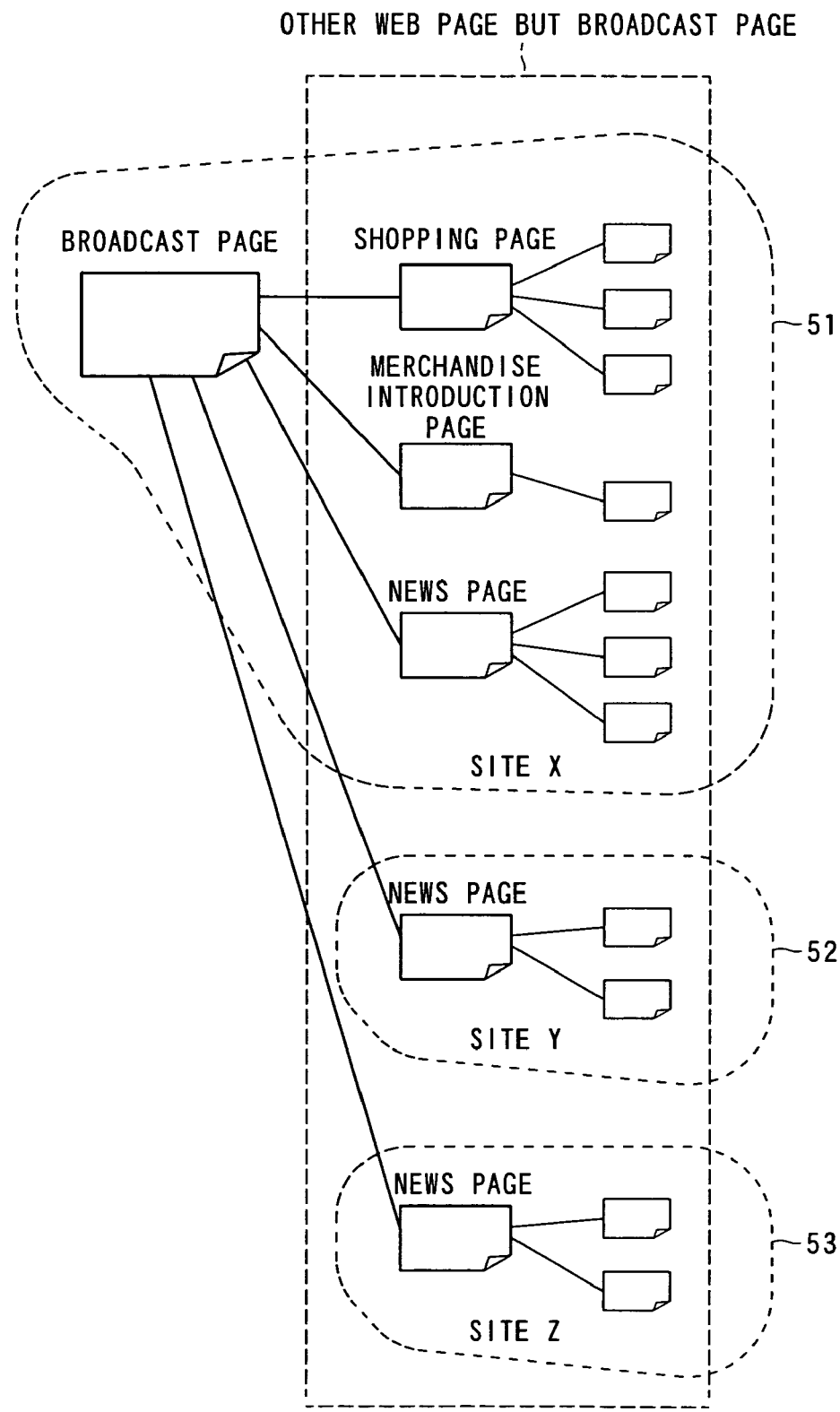
FIG. 7 is a view showing an example of link of respective web pages with a broadcast page as a center.

FIG. 7 is a view showing an example of link of respective web pages around a broadcast page. In the example of FIG. 7, the broadcast page is linked with a shopping page, a merchandise introduction page, a news page, and the like. These web pages are mutually different in URL. Web pages (including a broadcast page) circled with a broken line 51 in FIG. 7 are provided from a site X, web pages circled with a broken line 52 are provided from a site Y, and web pages circled with a broken line 53 are provided from a site Z. The site X has a strong relation with the site Y but a weak relation with the site Z.

The above waiting time can be set up every web page. For example, it is possible to set up in accordance with contents of information provided by the web pages. This is because it is considered that stay time of the pages (in other words, time for user browsing the page) is different from the content of the web page after transit on the human behavior. For example, a life-or-death monitor time to set the above waiting time is associated with URL of respective web pages, and registered on the life-or-death monitor time management table managed inside the ALM node program.

FIG. 8 is a view showing an example of information registered on a life-or-death monitor time management table. In the example of FIG. 8, a life-or-death monitor time of a shopping page is longer than other web pages because stay time of the shopping page is estimated long. And life-or-death monitor time of a news page is shorter than that of other web pages because stay time of news page is estimated short. Further, life-or-death monitor time of a news page provided from the site Y having strong relation with the site X is longer than that of a news page provided from the site Z having weak relation with the site X. This is because it is estimated that the web page provided from the more strongly related site has higher page-back probability (that is the probability of coming back from another site). Conversely, the less strongly related site is caused to be abandoned in the early states. Thus, withdrawal from the tree-type broadcast system S of the own node is suspended for a predetermined time according to estimated stay time of a web page.

When a web page is displayed by a browser (e.g. every display transit), URL of the web page is notified to ALM node program by a resident program (e.g. a browser plug-in installed in the browser) exchangeable of information with the browser. On the other hand, if an immediately previous page is a broadcast page in a case of transit to a new page in the ALM node program, a life-or-death monitor time corresponding to a URL is acquired from the above life-or-death monitor time management table using the URL acquired from the resident program as a search key and is set in the above monitor timer to start. In a case where the life-or-death monitor time cannot be obtained from the life-or-death monitor time management table, an initial value is used.

[2. Action of Tree-Type Broadcast System S]

Next, an action of a tree-type broadcast system S related to the present embodiment is explained.

(Process of Node Nn)

Figure 9:
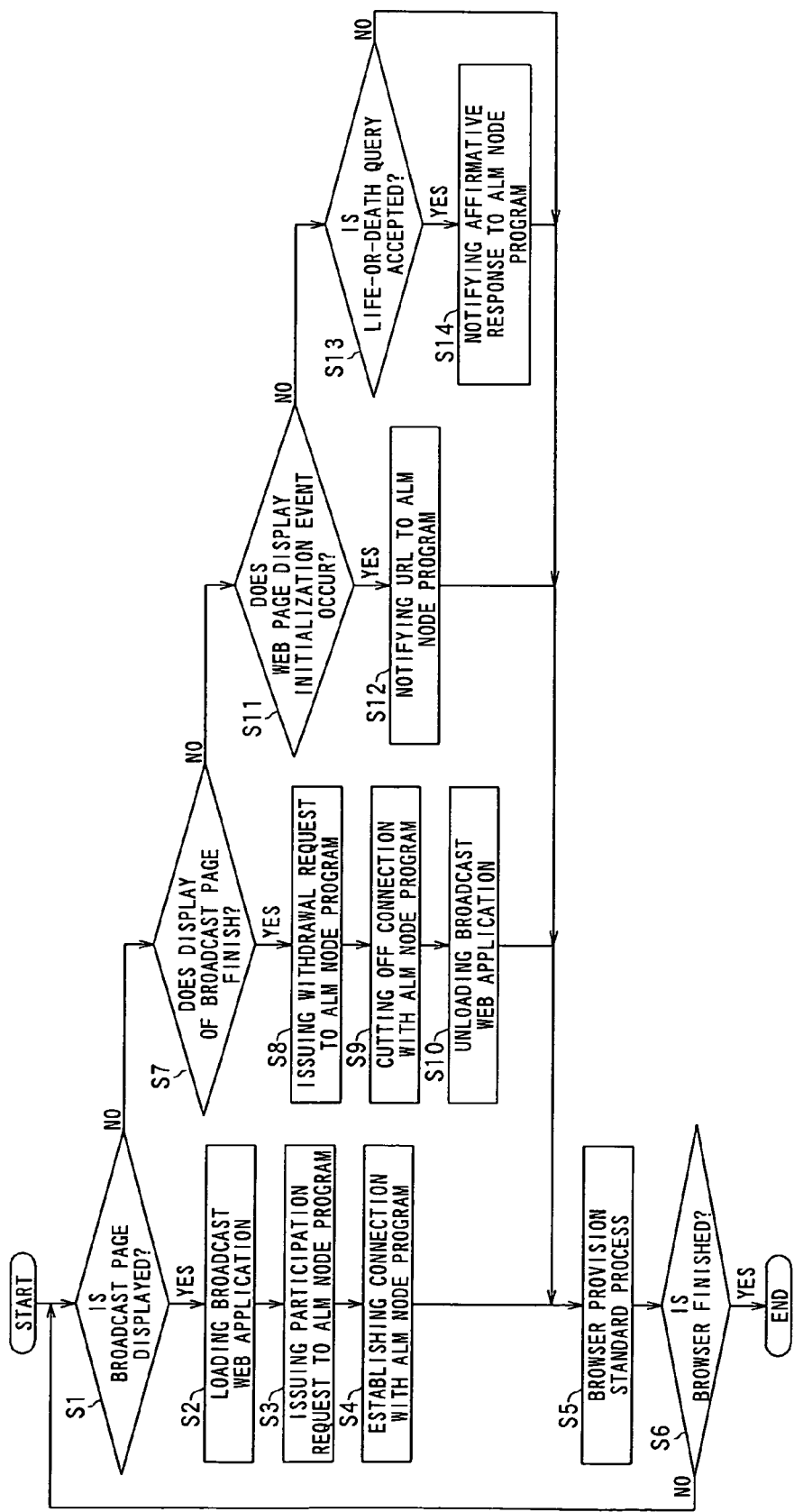
FIG. 9 is a flowchart showing a process of browser executed by the CPU 304.
Figure 10:
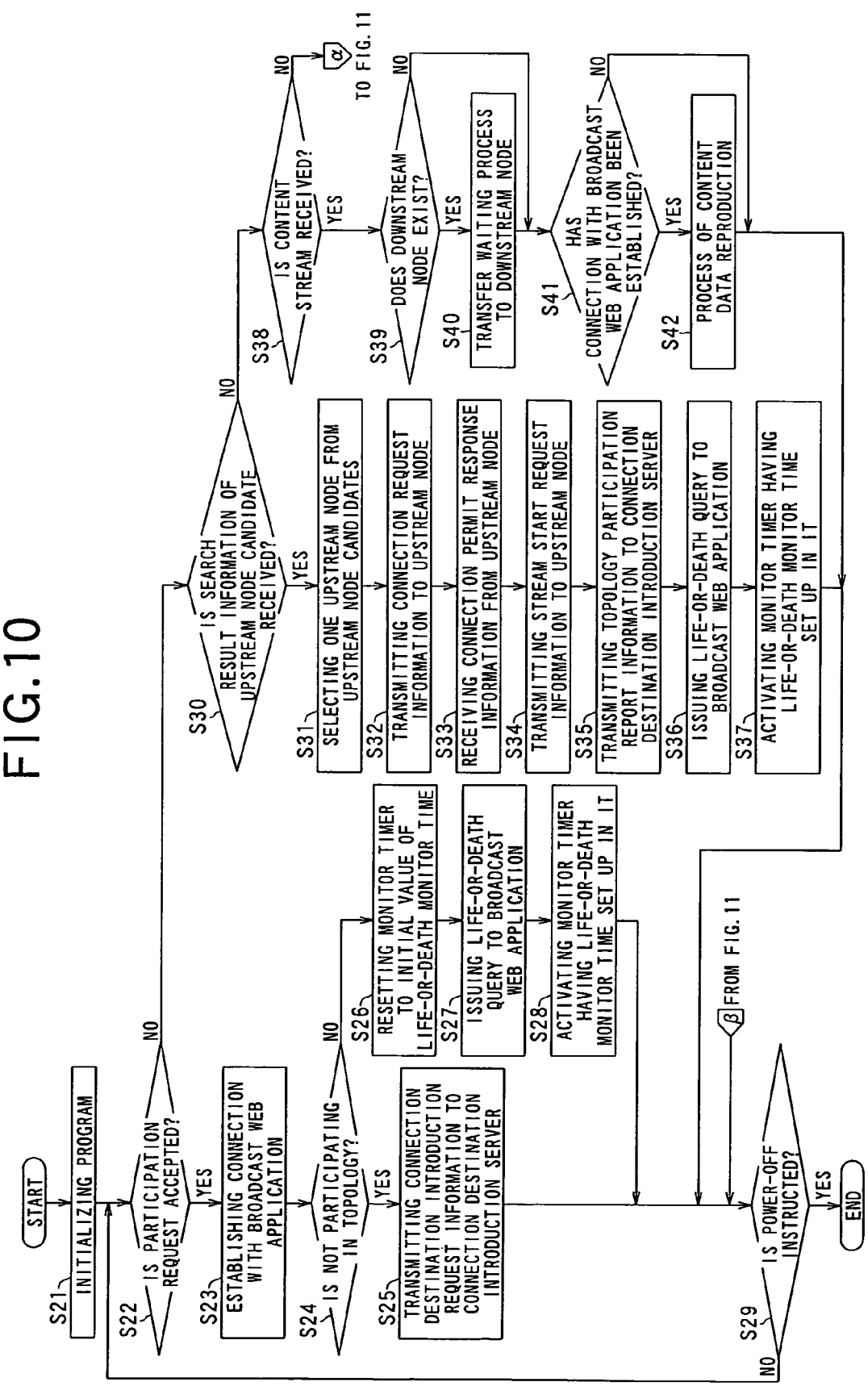
FIG. 10 is a flowchart showing a process of ALM node program executed by the CPU 304.
Figure 11:
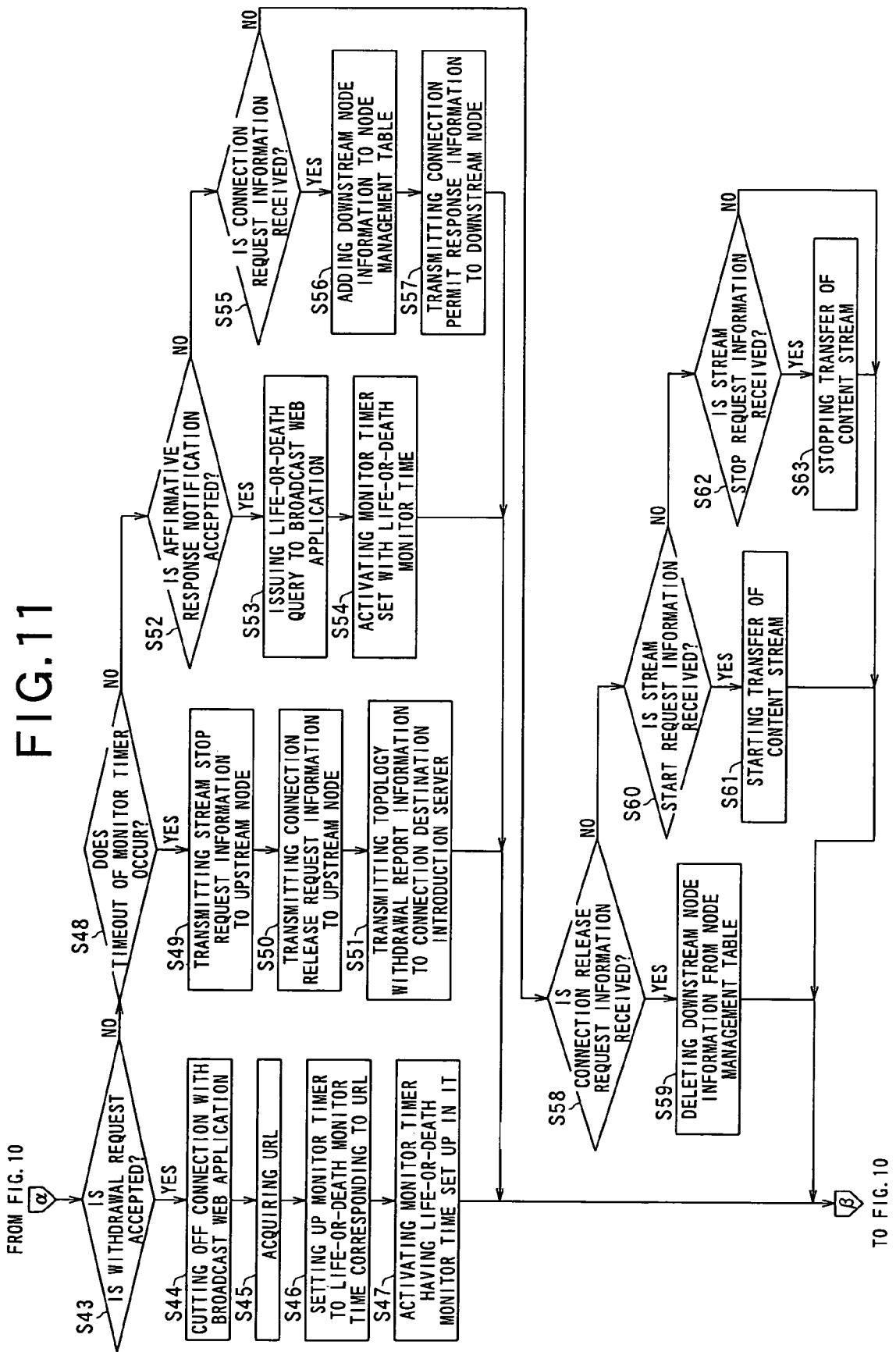
FIG. 11 is a flowchart showing a process of ALM node program executed by the CPU 304.

First, with reference to FIGS. 9 to 11, process of CPU 304 in a node Nn is explained.

FIG. 9 is a flowchart showing a process of browser executed by the CPU 304 and FIGS. 10 and 11 are flowcharts showing a process of ALM node program executed by the CPU 304.

A process of FIG. 9 starts by activating a browser. Here in a case where, for example, a default page of the browser (a page automatically displayed when the browser is activated) is set up, a site providing a web page based on URL of the web page is accessed, the web page is acquired via a network 8 and a network interface 305, and the page is displayed on a display 311.

In Step S1, it is judged whether or not a broadcast page is displayed or not. For example, in a case where a broadcast page is displayed as a default page of the browser or a broadcast page is displayed in "a browser provision standard process" described later (Step S1: YES), the process goes to Step S2. In a case where a broadcast page is not displayed (Step S1: NO), the process goes to Step S7.

In Step S2, a broadcast web application designated by the displayed broadcast page is loaded from a site, installed in the browser, and activated under the broadcast page.

Next in Step S3, the broadcast web application issues request for participating in a topology to an ALM node program. This participation request includes broadcast channel information.

Next in Step S4, connection between the broadcast web application and the ALM node program is established.

Next in Step S5, the browser provision standard process is executed. In this standard process various known processes are performed according to an user's instruction. For example, in a case where URL of the web page (e.g. broadcast page or news page) is designated by user via a keyboard 309, the web page is accessed by a site providing the web page based on thus designated URL, acquired, and displayed on the display 311.

Next in Step S6, whether or not the browser is terminated is judged. For example, if the user instructs to terminate the browser or cut off power source of the node Nn, it is judged the browser will be finished. If the browser is not finished (Step S6: NO), the process returns to Step S1.

On the other hand, in Step S7, whether or not display of the broadcast page ends is judged. For example, in the above-mentioned browser provision standard process, in a case where display transits from the broadcast page to the other web page or display of the broadcast page is terminated according to user's instruction (Step S7: YES), the process goes to Step S8. In a case where display of the broadcast page is not finished (Step S7: NO), the process goes to Step S11.

Next, in Step S8, a topology withdrawal request is issued from the broadcast web application to the ALM node program.

Next, in Step S9, the connection between the broadcast web application and the ALM node program is terminated.

Next in Step S10, the broadcast web application is unloaded.

On the other hand, in Step S11, it is judged whether or not web page display initialization event occurs. For example, in a case where a default page is displayed by activating a browser, or display of a web page transits according to a user's instruction, it is judged that web page display initialization event occurs (Step S11: YES), the process goes to Step S12. On the other hand, in a case where web page display initialization event does not occur (Step S11: NO), the process goes to Step S13.

In Step S12, for example, URL is notified to the ALM node program via a browser plug-in installed in the browser.

On the other hand, in Step S13, whether or not life-or-death query from the ALM node program is accepted is judged. In a case where the broadcast web application runs on the browser, the life-or-death query is accepted (Step S13: YES), affirmative response is notified to the ALM node program (Step S14). On the other hand, in a case where another web page but the broadcast page is displayed and the broadcast web application does not run on the browser, the life-or-death query is not accepted (Step S13: NO). Then the process goes to Step S5.

In a case where the browser is finished in Step S6 (Step S6: YES), if display of the broadcast page is finished as well, the similar processes as the above-mentioned Steps S8 to S10 are carried out. Then browser process is terminated.

On the other hand, the process of FIG. 10 starts by activating the ALM node program (e.g. by power-on).

In Step S21, the program is initialized. In the initialization process, for example, a file describing a value of life-or-death monitor time of respective URLs of the web page is downloaded from the center server and registered on the life-or-death monitor time management table. An initial value of the life-or-death monitor time is set to the monitor timer.

In Step S22, it is judged whether or not a request of participating in the topology issued from the broadcast web application (in the Step S3). In a case where the participation request is accepted (Step S22: YES), the process goes to Step S23. In a case where the participation request is not accepted (Step S22: NO), the process goes to Step S30.

In Step S23, connection between the ALM node program and the broadcast web application is established.

Next in Step S24, it is judged whether or not the own node is in a state of nonparticipation in topology. In a case where it is in a state of nonparticipating in topology (Step S24: YES), the connection (session) with a connection destination introduction server 20 via the network 8 according to IP address and port number of the connection destination introduction server 20 (previously set) is established, and the connection destination introduction request information (connection destination introduction message) is transmitted to the connection destination introduction server 20 (Step S25). Here, the connection destination introduction request information includes broadcast channel information.

Meanwhile, in a case where it is in a state of participating in the topology (Step S24: NO), for example, the news page is returned to the broadcast page while participation in the topology continues and therefore monitor timer is reset to be an initial value of life-or-death monitor time (Step S26). For example, the life-or-death monitor time of the news page is changed and set up to the life-or-death monitor time (initial value) of the broadcast page.

Next in Step S27, a life-or-death query is issued to the broadcast web application.

Next in Step S28, a monitor timer set with the life-or-death monitor time is activated (reset).

Next in Step S29, it is judged whether or not power-off is instructed. In a case where power-off is instructed (Step S29: YES), the process is terminated. In a case where power-off is not instructed (Step S29: NO), the process returns to Step S22.

In Step S30, it is judged whether or not search result information (search result message) of upstream node candidate is received from the connection destination introduction server 20. In a case where the search result information is received (Step S30: YES), the process goes to Step S31. In a case where the search result information is not received (Step S31: NO), the process goes to Step S38.

In Step S31, one upstream node is selected from upstream node candidates indicated in thus received search result information.

In Step S32, connection request information (connection request message) is transmitted to an IP address and a port number of the selected upstream node (broadcast station 20 in some cases) via the network 8.

Next in Step S33, connection permit response information (connection permit response message) from the upstream node is received and connection (session) between the own node and the upstream node is established.

Next in Step S34, stream start request information (stream start request message) is transmitted to the upstream node.

Next in Step S35, topology participation report information (topology participation report message) is transmitted to the connection destination introduction server 20.

Next in Step S36, a life-or-death query is issued to the broadcast web application.

Next in Step S37, the monitor timer with the life-or-death monitor time set up in it is activated.

On the other hand, in Step S38, it is judged whether or not a content stream from the upstream node is received. In a case where the content stream is received (Step S38: YES), the process goes to Step S39. In a case where the content stream is not received (Step S38: NO), the process goes to Step S43.

Next in Step S39, it is judged whether or not there is a downstream node connected to the own node. In a case where there is the downstream node (Step S39: YES), the process goes to Step S40. In a case where there is not the downstream node (Step S39: NO), the process goes to Step S41.

In Step S40, a transfer (streaming) waiting process is carried out with respect to the downstream node of the received content stream.

In Step S41, it is judged whether or not connection between the ALM node program and the broadcast web application is established. In a case where the connection is established (Step S41: YES), content data which are receive and accumulated in a buffer memory are reproduced.

On the other hand, in Step S43 shown in FIG. 11, it is judged whether or not the topology withdrawal request issued from the broadcast web application is accepted (in the Step S8). In a case where the withdrawal request is accepted (Step S43: YES), the process goes to Step S44. In a case where the withdrawal request is not accepted (Step S43: NO), the process-goes to Step S48.

In Step S44, the connection between the ALM node program and the broadcast web application is terminated.

Next in Step S45, URL from the browser plug-in in the Step S12 is acquired.

Next in Step S46, life-or-death monitor time corresponding to thus acquired URL is specified from the life-or-death monitor time management table, and the monitor timer is set up to be thus specified life-or-death monitor time. In a case where a life-or-death monitor time corresponding to the acquired URL is not registered, an initial value is set up to be the monitor timer of the life-or-death monitor time.

Next in Step S47, the monitor timer set up to be the life-or-death monitor time is activated (reset).

On the other hand, in Step S48, it is judged whether or not timeout of thus activated monitor timer occurs. In a case where the timeout occurs (Step S48: YES), that is, there is no affirmative response from the broadcast web application and the life-or-death monitor time (waiting time) set up in the monitor timer elapses, the process goes to Step S49. In a case where the timeout does not occur (Step S48: NO), the process goes to Step S52.

In Step S49, stream stop request information (stream stop request message) is transmitted to an upstream node.

Next in Step S50, connection release request information (connection release request message) is transmitted to the upstream node.

Next in Step S51, topology withdrawal report information (topology withdrawal report message) is transmitted to the connection destination introduction server 20.

On the other hand, in Step S52, it is judged whether or not affirmative response notification from the broadcast web application is accepted. In a case where the affirmative response notification is accepted (Step S52: YES), the process goes to Step S53. In a case where the affirmative response notification is not accepted (Step S52: NO), the process goes to Step S55.

In Step S53, the life-or-death query is issued to the broadcast web application.

Next in Step S54, the monitor timer set up to have the life-or-death monitor time is activated (is reset and restarted).

On the other hand, in Step S55, it is judged whether or not connection request information from a downstream node is received. In a case where the connection request information is received (Step S55: YES), the process goes to Step S56. In a case where the connection request information is not received (Step S55: NO), the process goes to Step S58.

In Step S56, information of the downstream node (e.g. IP address and port number) is added to the node management table.

Next in Step S57, connection permit response information is transmitted to the downstream node.

On the other hand, in Step S58, it is judged whether or not the connection release request information is received from the downstream node. In a case where the connection release request information is received (Step S58: YES), the process goes to Step S59. In a case where the connection release request information is not received (Step S58: NO), the process goes to Step S60.

In Step S59, information of the downstream node (e.g. IP address and port number) is deleted from the node management table.

On the other hand, in Step S60, whether or not stream start request information from the downstream node is received is judged. In a case where the stream start request information is received (Step S60: YES), the process goes to Step S61. In a case where the stream start request information is not received (Step S62: NO), the process goes to Step S29.

In Step S61, it is started to transfer (streaming) content stream to the downstream node.

On the other hand, in Step S62, it is judged whether or not stream stop request information from the downstream node is received. In a case where the stream stop request information is received (Step S62: YES), the process goes to Step S63. In a case where the stream stop request information is not received (Step S62: NO), the process goes to Step S29.

In Step S63, the transfer (streaming) of content stream to the downstream node is stopped.

(Process of Broadcast Station 10)

Figure 12:
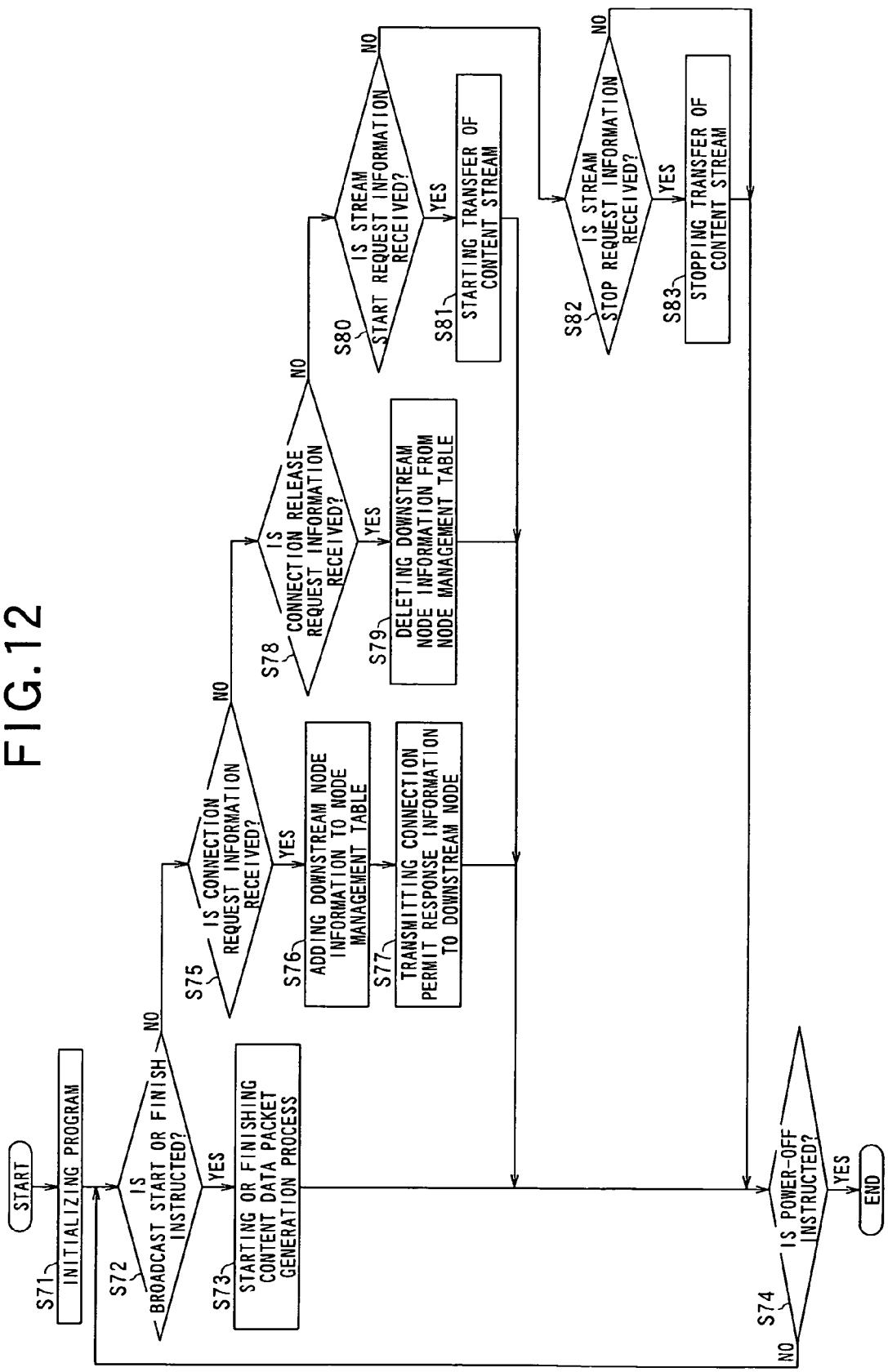
FIG. 12 is a flowchart showing a process of stream control program and the like executed by the CPU 104.

Next, with reference to FIG. 12, a process of CPU 104 in a broadcast station 10 is explained.

FIG. 12 is a flowchart showing a process of the stream control program and the like which is executed by the CPU 104.

The process in FIG. 12 starts by activating (e.g. power-on) the stream control program and the like.

In Step S71, a program is initialized. In such an initialization process, broadcast station registration request information (registration request message: including location information of the broadcast station 10) is transmitted to a connection destination introduction server 20. When the program initialization process is completed, message from the node Nn becomes receivable.

Next, in Step S72, it is judged whether or not broadcast start or finish is instructed from a broadcast operator. In a case where the broadcast start or finish is instructed, the process goes to Step S73. In a case where the broadcast start or finish is not instructed, the process goes to Step S75.

In Step S73, a content data packet generation process is started or finished. When the content data packet generation process starts, the content data recorded in a hard disk unit 103 are accessed to be read out, the content data packet is generated in synchronism with a system timer, and the packet is stored in a buffer memory. On the other hand, when the content data packet generation process is finished, access to read out content data recorded in the hard disk unit 103 is terminated and the buffer memory is cleared.

Next in Step S74, it is judged whether or not power-off is instructed. In a case where power-off is instructed (Step S74: YES), the process is finished. In a case where power-off is not instructed (Step S74: NO), the process returns to Step S72. Here, when the process is finished, delete request information (delete request message: including location information and the like of the broadcast station 10) of the broadcast station is transmitted to the connection destination introduction server 20.

On the other hand, in Step S75, it is judged whether or not connection request information from a downstream node is received. In a case where the connection request information is received (Step S75: YES), the process goes to Step S76. In a case where the connection request information is not received (Step S75: NO), the process goes to Step S78.

In Step S76, information (e.g. IP address and port number) of the downstream node is added to the node management table.

Next in Step S77, a connection permit response information is transmitted to the downstream node.

On the other hand, in Step S78, it is judged whether or not connection release request information from the downstream node is received. In a case where the connection release request information is received (Step S78: YES), the process goes to Step S79. In a case where the connection release request information is not received (Step S78: NO), the process goes to Step S80.

In Step S79, the information (e.g. IP address and port number) of the downstream node is deleted from the node management table.

On the other hand, in Step S80, whether or not stream start request information from the downstream node is received is judged. In a case where the stream start request information is received (Step S80: YES), the process goes to Step S81. In a case where the stream start request information is not received (Step S80: NO), the process goes to Step S82.

In Step S81, transfer (streaming) of content stream to the downstream node starts.

On the other hand, in Step S82, it is judged whether or not stream stop request information from the downstream node is received. In a case where the stream stop request information is received (Step S82: YES), the process goes to Step S83. In a case where the stream stop request information is not received (Step S82: NO), the process goes to Step S74.

In Step S83, transfer (steaming) of content stream to the downstream node is stopped.

(Process of Connection Destination Introduction Server 20)

Figure 13:
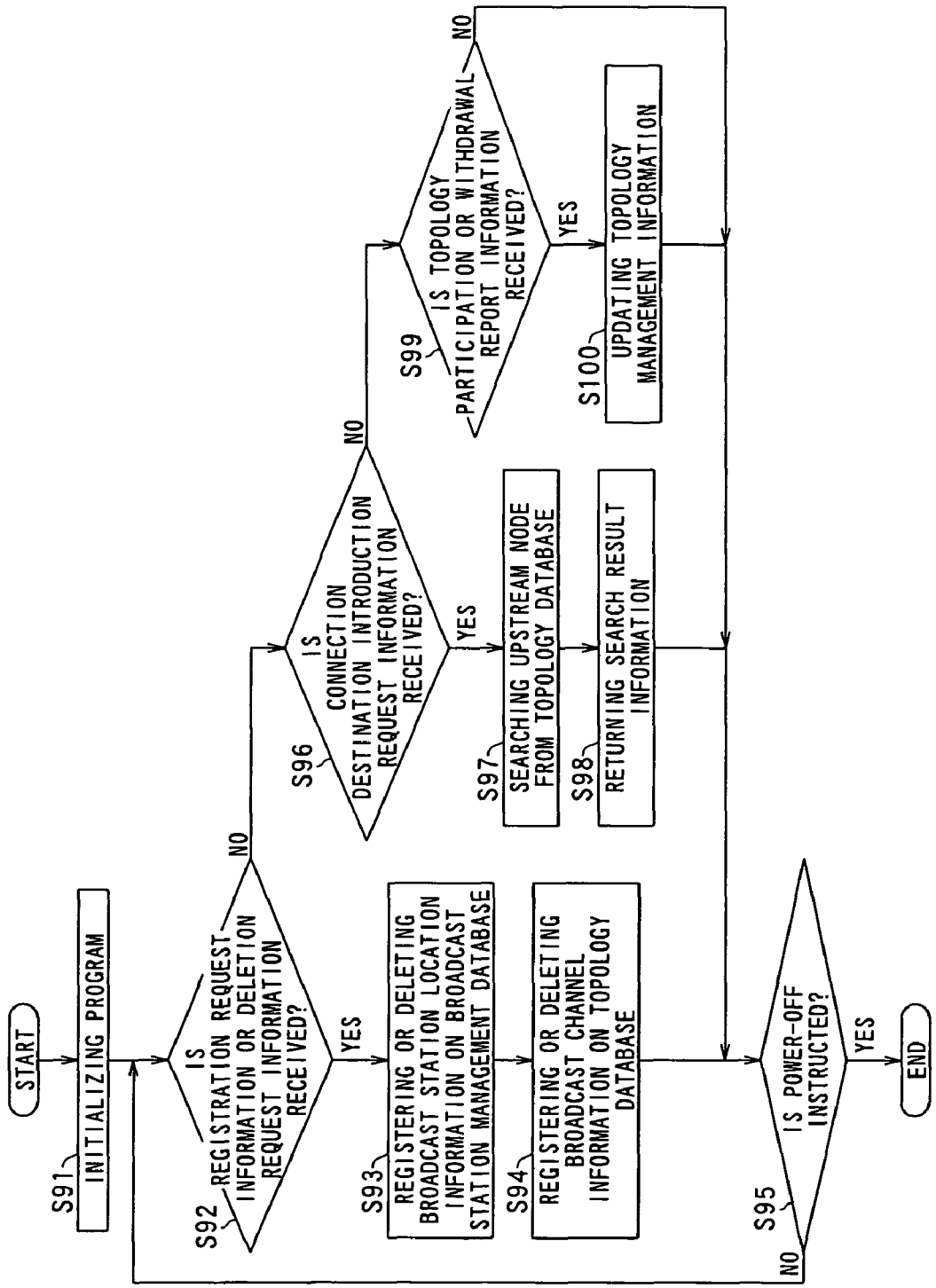
FIG. 13 is a flowchart showing a process of topology management program, connection destination introduction program and the like executed by the CPU 204.

Next, with reference to FIG. 13, a process of CPU 204 in a connection destination introduction server 20 is explained.

FIG. 13 is a flowchart showing a process of a topology management program, a connection destination introduction program, and the like which are executed by the CPU 204.

A process in FIG. 13 starts by activating (e.g. power-on) a topology management program, a connection destination introduction program, and the like.

In Step S91, a program is initialized. When initialization process of the program is completed, a message from a node Nn and a broadcast station 10 becomes receivable.

Next in Step S92, it is judged whether or not registration request information or delete request information is received from the broadcast station 10. In a case where the registration request information or the delete request information is received (Step S92: YES), the process goes to Step S93. In a case where the registration request information or the delete request information is not received (Step S92: NO), the process goes to Step S96.

In Step S93, location information and the like included in the registration request information is registered on the broadcast station management database corresponding to broadcast channel information. Or location information and the like included in the delete request information is deleted from the broadcast station management database.

Next in Step S94, broadcast channel information corresponding to the broadcast station 10, registered along with the location information, is registered on the topology database. Or the broadcast channel information is deleted from the topology database.

Next in Step S95, it is judged whether or not power-off is instructed. In a case where it is instructed to power off (Step S95: YES), the process is finished. In a case where power-off is not instructed (Step S95: NO), the process returns to Step S92.

On the other hand, in Step S96, it is judged whether or not connection destination introduction request information from a node Nn is received. In a case where the connection destination introduction request information is received (Step S96: YES), the process goes to Step S97. In a case where the connection destination introduction request information is not received (Step S96: NO), the process goes to Step S99.

In Step S97, for example, an upstream node corresponding to the broadcast channel information included in the connection destination introduction request information is searched and IP address, port number, and the like of a searched upstream node candidate exceeding one are acquired.

Next in Step S98, search result information including IP address, port number and the like of thus acquired upstream node candidate is returned to the node Nn, requesting to introduce the connection destination.

On the other hand, in Step S99, it is judged whether or not topology participation report information or topology withdrawal report information from the node Nn is received. In a case where the topology participation report information or the topology withdrawal report information is received (Step S99: YES), the process goes to Step S100. In a case where topology participation report information or topology withdrawal report information is not received (Step S99: NO), the process goes to Step S95.

In Step S100, topology management information registered on the topology database is updated according to the topology participation report information or the topology withdrawal report information. Then variation of the topology is reflected.

As explained above, according to the present embodiment, when a broadcast page related to content data is displayed, a process of participation in a tree-type broadcast system S (topology) is carried out. When display of the broadcast page is finished and transited to the other web page, it is configured to carry out a process of withdrawal from the tree-type broadcast system S on the condition that the broadcast page is not redisplayed within the previously set waiting time. When the tree-type broadcast system S having a hierarchy topology formed as a broadcast path is used from a web application, the node Nn does not withdraw from the tree-type broadcast system S for a period of waiting time of the page, even if the page transits from the broadcast page to other web page. Therefore, even if there is web browsing operation of frequently repeating page transition on the basis of a broadcast page, the node Nn does not frequently withdraw from nor re-participate in the topology. Therefore, stability of the topology is secured. That is, even if display of web page is frequently switched over broadcast pages, topology can be stabilized.

As an extreme control method to secure topology stability, a method where a node Nn participates in a tree-type broadcast system S at the time point when a browser first displays a broadcast page, and it withdraws from the tree-type broadcast system S at the time point when the operating system is finished is exemplified. Compared with this method, a control method of the present invention is more effective because the control method can reduce consumption of wasteful network resource (e.g. bandwidth) which is against intention of a user in a network environment of the user.

Further, the above-mentioned embodiment is configured to individually set up a waiting time (set as life-or-death monitor time) according to contents of information provided by the other web pages transited from the broadcast page. In a case of transiting from the broadcast page to the other web page, it is configured such that a node Nn does not withdraw from the tree-type broadcast system S for a period of estimated stay time specific to the page. Therefore, convenience for users can be improved.

Meanwhile, as a modified example of the above-mentioned embodiment, it may be configured that a resident program (e.g. browser plug-in) exchangeable of information with a browser learn browser operation pattern of a user and appropriately set up the above-mentioned waiting time according thereto. For example, the waiting time is to be set up based on the past display time of the other web page transmitted from the broadcast page. Particularly, a recent user's stay time in the web page focused except for the broadcast page is stored, an average time of plural stay times stored is set up as a life-or-death monitor time, and it is registered on a life-or-death monitor time management table in association with URL of the web page. And it is configured to set up the life-or-death monitor time of the averaged stay time at the time of transiting to the web page (Step S46 shown in FIG. 11). Therefore, since the waiting time can be set up according to the past display pattern of the web page of respective users, convenience can be further improved for users.

Further, as another modified example, the waiting time in respective nodes Nn may be configured to be set up according to hierarchy position (topology hierarchy level) of the own node in the tree-type broadcast system S. That is, the lower the topology hierarchy level is (upstream side of hierarchy), the longer the life-or-death monitor time is set up. For example, it is realized by multiplying an estimated stay time of the web page by coefficient set up for every topology hierarchy level (final life-or-death monitor time=life-or-death monitor time obtained from estimated stay time×{1+0.1×(all current hierarchy levels−hierarchy level of own node)}). Thus, the closer to a content source (broadcast station) a node (upstream node) is, the more difficult it is to withdraw from the tree-type broadcast system S. Therefore, stability of the topology can be improved.

Furthermore, as another modified example, the waiting time in respective nodes Nn may be configured to be set up according to the number of downstream nodes (downstream relay number) connected to the own node in the tree-type broadcast system S. That is, the larger the downstream relay number is, the longer the life-or-death monitor time is. For example, it is realized by multiplying an estimated stay time of the web page by coefficient corresponding to the downstream relay number (final life-or-death monitor time=life-or-death monitor time obtained from estimated stay time×{1+0.1× current downstream relay number}). Thus, the more the node is transferred (relayed) to the downstream node, the more difficult it is to withdraw from the tree-type broadcast system S. Therefore, stability of the topology can be improved.

Meanwhile, although the web page obtained from the predetermined site is exemplified to explain the above-mentioned embodiment, a broadcast information screen related to the content data displayed by a function of an application installed in the node and the other transited screen (e.g. screen related to calendar, word processor, and calculation) may be applied instead of the web page acquired from the site. In this case, an effect similar to the above-mentioned embodiment can be achieved.

The present invention is not confined to the configurations listed in the foregoing embodiments, but it is easily understood that the person skilled in the art can modify such configurations into various other modes, within the scope of the present invention described in the claims.

What is claimed is:

1. A node device in a tree-type broadcast system which is formed by participation of a plurality of node devices and comprises a plurality of hierarchy levels in a tree-like shape formed by the plurality of node devices while placing a broadcast device at a top of the hierarchy levels and connecting the plurality of node devices through a communication unit, wherein content data broadcasted by the broadcast device is sequentially transferred from a node device at an upper hierarchy level to a node device at a lower hierarchy level, wherein the content data is broadcasted through the plurality of node devices participating in the tree-type broadcast system, wherein the tree-type broadcast system is an overlay network formed by participation of all or part of the plurality of node devices which are connected to each other via the communication unit, the node device comprising:
a display control unit configured to control display to display a predetermined screen; and
a participation and withdrawal control unit configured to carry out a participation process of participating in the tree-type broadcast system when a broadcast information screen related to broadcast of the content data is displayed with the display control unit and to carry out a withdrawal process of withdrawing from the tree-type broadcast system when display of the broadcast information screen is finished with the display control unit, or when a transition of display to another screen occurs with the display control unit,
wherein in a case where the display of the broadcast information screen is finished with the display control unit or the transition of display to another screen occurs with the display control unit, the participation and withdrawal control unit continues the participation process of participating in the tree-type broadcast system when the display of the broadcast information screen is finished within a waiting time previously set up or the transition of display to another screen occurs within the waiting time previously set up, and carries out the withdrawal process on a condition that the broadcast information screen is not displayed again with the display control unit within the waiting time previously set up.

2. The node device according to claim 1,
wherein the waiting time is set up in response to content of information, provided by the another screen thus transited.

3. The node device according to claim 1,
wherein the waiting time is set up based on a past display time of the another screen thus transited.

4. The node device according to claim 1,
wherein the waiting time is set up in response to hierarchy levels of an own node device in the tree-type broadcast system.

5. The node device according to claim 1,
wherein the waiting time is set up in response to a number of node devices in the lower hierarchy level, the node devices being connected to an own node device in the tree-type broadcast system.

6. The node device according to claim 1,
wherein the display control unit acquires a web page from a predetermined server connected to a network based on URL (Uniform Resource Locator) of the web page constituting the screen and displays the screen.

7. The node device according to claim 1, wherein the device further comprises a determining unit that determines the waiting time in accordance with content in the broadcast information screen to which the transition of display occurs with the display control unit.

8. The node device according to claim 7, wherein in case where content in the broadcast information screen to which the transition of display occurs with the display control unit relates to shopping, the determining unit determines that the waiting time is longer than that in case where the content are different from shopping.

9. A non-transitory computer-readable storage medium that stores a computer-executable program for a node device in a tree-type broadcast system which is formed by participation of a plurality of node devices and comprises a plurality of hierarchy levels in a tree-like shape formed by the plurality of node devices while placing a broadcast device at a top of the hierarchy levels and connecting the plurality of node devices through a communication unit, wherein content data broadcasted by the broadcast device is sequentially transferred from a node device at an upper hierarchy level to a node device at a lower hierarchy level, wherein the content data is broadcasted through the plurality of node devices participating in the tree-type broadcast system, wherein the tree-type broadcast system is an overlay network formed by participation of all or part of the plurality of node devices which are connected to each other via the communication unit,
the program comprising the instructions for:
controlling display to display a predetermined screen with the node device in the tree-type broadcast system; and
carrying out a participation process of participating in the tree-type broadcast system when a broadcast information screen related to broadcast of the content data is displayed with a display control unit and carrying out a withdrawal process of withdrawing from the tree-type broadcast system when display of the broadcast information screen is finished with the display control unit, or when a transition of display to another screen occurs with the display control unit,
wherein in a case where the display of the broadcast information screen is finished with the display control unit or the transition of display to another screen occurs with the display control unit, the participation and withdrawal control unit continues the participation process of participating in the tree-type broadcast system when the display of the broadcast information screen is finished within a waiting time previously set up or the transition of display to another screen occurs within the waiting time previously set up, and carries out the withdrawal process on a condition that the broadcast information screen is not displayed again with the display control unit within the waiting time previously set up.

10. A tree-type broadcast system which is formed by participation of a plurality of node devices and comprises a plurality of hierarchy levels in a tree-like shape formed by the plurality of node devices while placing a broadcast device at a top of the hierarchy levels and connecting the plurality of node devices through a communication unit, wherein content data broadcasted by the broadcast device is sequentially transferred from a node device at an upper hierarchy level to a node device at a lower hierarchy level,
 wherein the content data is broadcasted through the plurality of node devices participating in the tree-type broadcast system, wherein the tree-type broadcast system is an overlay network formed by participation of all or part of the plurality of node devices which are connected to each other via the communication unit, the node device comprising:
 a display control unit configured to control display to display a predetermined screen; and
 a participation and withdrawal control unit configured to carry out a participation process of participating in the tree-type broadcast system when a broadcast information screen related to broadcast of the content data is displayed with the display control unit and to carry out a withdrawal process of withdrawing from the tree-type broadcast system when display of the broadcast information screen is finished with the display control unit, or when a transition of display to another screen occurs with the display control unit,
 wherein in a case where the display of the broadcast information screen is finished with the display control unit or the transition of display to another screen occurs with the display control unit, the participation and withdrawal control unit continues the participation process of participating in the tree-type broadcast system when the display of the broadcast information screen is finished within a waiting time previously set up or the transition of display to another screen occurs within the waiting time previously set up, and carries out the withdrawal process on a condition that the broadcast information screen is not displayed again with the display control unit within the waiting time previously set up.

11. A method of participating in and withdrawing from a tree-type broadcast system which is formed by participation of a plurality of node devices and comprises a plurality of hierarchy levels in a tree-like shape formed by the plurality of node devices while placing a broadcast device at a top of the hierarchy levels and connecting the plurality of node devices through a communication unit, wherein content data broadcasted by the broadcast device is sequentially transferred from a node device at an upper hierarchy level to a node device at a lower hierarchy level, wherein the content data is broadcasted through the plurality of node devices participating in the tree-type broadcast system, wherein the tree-type broadcast system is an overlay network formed by participation of all or part of the plurality of node devices which are connected to each other via the communication unit,
 the method comprising the steps of:
 controlling display to display a predetermined screen, with the node device in the tree type broadcast system; and
 carrying out a participation process of participating in the tree-type broadcast system when a broadcast information screen related to broadcast of the content data is displayed with a display control unit and carrying out a withdrawal process of withdrawing from the tree-type broadcast system when display of the broadcast information screen is finished with the display control unit, or when a transition of display to another screen occurs with the display control unit,
 wherein in a case where the display of the broadcast information screen is finished with the display control unit or the transition of display to another screen occurs with the display control unit, continuing the participation process of participating in the tree-type broadcast system when the display of the broadcast information screen is finished within a waiting time previously set up or the transition of display to another screen occurs within the waiting time previously set up, and
 carrying out the withdrawal process on a condition that the broadcast information screen is not displayed again with the display control unit within the waiting time previously set up.

* * * * *